(12) United States Patent
Cavell

(10) Patent No.: US 7,229,057 B2
(45) Date of Patent: Jun. 12, 2007

(54) MULTI-PURPOSE ANTI-SWAY ROTATING STEM MOUNT

(76) Inventor: Christopher N. Cavell, 154 Shrewsbury Rd., Dartmouth, Nova Scotia (CA) B2V 2R9

( * ) Notice: Subject to any disclaimer, the term of this patent is extended or adjusted under 35 U.S.C. 154(b) by 370 days.

(21) Appl. No.: 11/006,598

(22) Filed: Dec. 8, 2004

(65) Prior Publication Data
US 2006/0118690 A1 Jun. 8, 2006

(51) Int. Cl.
B42F 13/00 (2006.01)

(52) U.S. Cl. ............ 248/343; 248/580; 248/610; 248/317; 211/115

(58) Field of Classification Search ......... 416/244 R, 416/174; 384/226, 227, 228, 230, 535, 536; 248/317, 342, 343, 344, 561, 570, 580, 581, 248/589, 605, 610; 211/95, 115; 108/42
See application file for complete search history.

(56) References Cited

U.S. PATENT DOCUMENTS

| | | | |
|---|---|---|---|
| 1,078,729 A | 11/1913 | Hill | |
| 1,246,633 A | 11/1917 | Marquart | |
| 2,051,205 A | 8/1936 | Estabrook | |
| 2,174,747 A | 10/1939 | Hueglin | |
| 2,326,064 A | 8/1943 | Pittman | |
| 3,362,671 A * | 1/1968 | Johnson | 248/324 |
| 3,561,719 A * | 2/1971 | Grindle | 248/343 |
| 3,780,875 A | 12/1973 | Scholl | |
| 3,879,799 A * | 4/1975 | Williams | 16/89 |
| 4,128,281 A * | 12/1978 | Batkiewicz | 384/536 |
| 4,193,571 A | 3/1980 | Bula | |
| 4,837,891 A * | 6/1989 | Toma et al. | 16/87.4 R |
| 5,568,954 A * | 10/1996 | Burgess | 292/338 |
| 6,311,943 B1 * | 11/2001 | Tang | 248/343 |

* cited by examiner

Primary Examiner—Cari D. Friedman
Assistant Examiner—Bradley Duckworth
(74) Attorney, Agent, or Firm—Mario Theriault

(57) ABSTRACT

The rotating stem mount has an anchor block and a lag screw extending through the anchor block for mounting the anchor block to a stationary surface. A guide bearing is mounted on a circular shoulder on the anchor block near the base end of the anchor block. The outer race of a thrust bearing is retained to the load end of the anchor block in axial alignment with the anchor block by means of a bearing retainer. A cylindrical housing encloses the thrust bearing, the guide bearing and the anchor block. The housing has a diametrical partition therein in a mid-region thereof. A bolt retains the diametrical partition to the inner race of the thrust bearing. The housing further has an internal circular step in its base end, and that circular step fitly encloses the guide bearing. A stem-like member is mountable to the load end of the housing.

20 Claims, 3 Drawing Sheets

MULTI-PURPOSE ANTI-SWAY ROTATING STEM MOUNT

FIELD OF THE INVENTION

This invention pertains to devices for mounting stems to ceilings, walls and floors, and more particularly, it pertains to rotating stem mounts having a double bearing arrangement therein to resist both axial and transverse loads thereon.

BACKGROUND OF THE INVENTION

The uses of rotating stem mounts are numerous and include overhead supports for vertical clothes racks. This specific application and its type will be used herein to explain the structure and advantages of the rotating stem mount according to the present invention.

The attachment of a clothes rack to the ceiling has been considered by several inventors in the past, to improve on the stability of these racks, basically. Free-standing post-type clothes racks are commonly found behind a door of a building so that people coming into the building can hang their coats, scarves and hats on them. Generally, these racks have a relatively small base as compared to their height and when they are loaded on one side they become unstable. These clothes racks also stand in the way of a person cleaning the floor beneath them, or are often pushed down by young children riding on tricycles and on other similar riding toys.

In order to obviate the use of a free-standing post-type clothes rack and other supports of the like, several models of ceiling-mounted stem-like hangers were developed in the past. Some of these racks remain fixed, while others have the ability to rotate about their vertical axes. Generally, the rotating stem-like racks of the prior art have only one bearing therein and this bearing is adapted to support axial or thrust loads only. Therefore when a side load is applied to the stem of the rack, such as when the rack is loaded on one side only, the bearing housing of the device tilts slightly causing the thrust bearing to separate from its bearing seat. This lateral misalignment of the stem relative to the bearing housing usually causes a resistant surface-to-surface contact between the stem-supporting member and the housing of the device whereby the bearing is no longer effective and the rotation of the stem becomes difficult.

Examples of suspended hangers of the prior art are disclosed in the following documents:

U.S. Pat. No. 1,078,729 issued to L. C. Hill on Nov. 18, 1913;

U.S. Pat. No. 1,246,633 issued to F. Marquart on Nov. 13, 1917;

U.S. Pat. No. 2,051,205 issued to J. B. Estabrook on Aug. 18, 1936;

U.S. Pat. No. 2,174,747 issued to H. C. Hueglin on Oct. 3, 1939;

U.S. Pat. No. 3,362,671 issued to E. P. Johnson on Jan. 9, 1968;

U.S. Pat. No. 3,780,875 issued to L. L Scholl on Dec. 25, 1973.

The design of a ceiling-mounted rotating stem mount is subject to numerous constraints, one of which is aesthetics. The design of wall and ceiling fixtures for modern houses requires that the fasteners holding the fixture in place should be hidden from view. Another required feature of modern wall and ceiling fixtures is that the average handyman must be capable of easily mounting the fixture using basic hand tools.

It is believed that because of these design constraints, basically, the prior art does not contain an easy-to-install and visually-appealing rotating stem mount having a tandem bearing arrangement therein to resist both axial and lateral loads. Therefore, it is believed that a need still exists for a rotating stem mount that allows a frictionless rotation of the stem under various loading conditions.

SUMMARY OF THE INVENTION

In the present invention, however, there is provided an anti-sway rotating stem mount that has two spaced-apart bearings therein and a structure that is visually compatible with modern ceiling and wall fixtures, and that is easy to install with minimum tools.

In accordance with one aspect of the present invention, there is provided a stem mount for rotatably supporting a stem-like member to a stationary surface. This stem mount comprises an anchor block having a hollow cylindrical shape, and a base end and a load end along a central axis thereof. The anchor block has a central hole in the base end thereof. A lag screw is mounted in that central hole for attachment of the anchor block to a stationary surface. The anchor block has a cylindrical outside surface and a circular shoulder on that surface adjacent the base end. A guide bearing is mounted on the circular shoulder. A thrust bearing is retained to the load end of the anchor block in axial alignment with the anchor block by means of a bearing retainer. The bearing retainer encloses and holds the outer race of the thrust bearing in a fixed relationship with the anchor block.

The stem mount further includes a cylindrical housing enclosing the thrust bearing, the guide bearing and the anchor block. The housing has a diametrical partition therein in a mid-region thereof. A bolt is used to retain the diametrical partition to the inner race of the thrust bearing. The housing further has an internal circular step in one of its ends, and that circular step encloses the circumference of the guide bearing.

Because of the two spaced-apart bearings, a stem-like member that is affixed to the housing is easily rotated about its longitudinal axis even when a combination of an axial and side forces are applied to it.

In another aspect of the present invention, the bearing retainer is a cylindrical cap threaded over the outside surface of the anchor block. The anchor block has a cylindrical cavity therein and a wall around that cavity. The cavity encloses the head of the lag screw and the head of the bolt retaining the housing to the thrust bearing. The bearing retainer further includes a set screw extending radially through the wall of the anchor block. This set screw is movable to bear against the head of the bolt retaining the housing to the anchor block, to retain that bolt in a fixed relationship with the anchor block. This set screw, in its extended position, prevents a rotation of the bolt when the housing is being affixed to the bolt. A hole is provided in the side of the housing to retract the set screw after assembling the housing, to release the bolt and to allow a rotation of the inner race of the thrust bearing and of the housing relative to the anchor block.

Because of its configuration with separable anchor block and thrust bearing, the stem mount according to the present invention is easily affixed to a ceiling for example, and has no exposed fastener.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

One embodiment of the present invention is illustrated in the accompanying drawings, in which like numerals denote like parts throughout the several views, and in which.

DESCRIPTION OF THE PREFERRED EMBODIMENT

Figure 1:
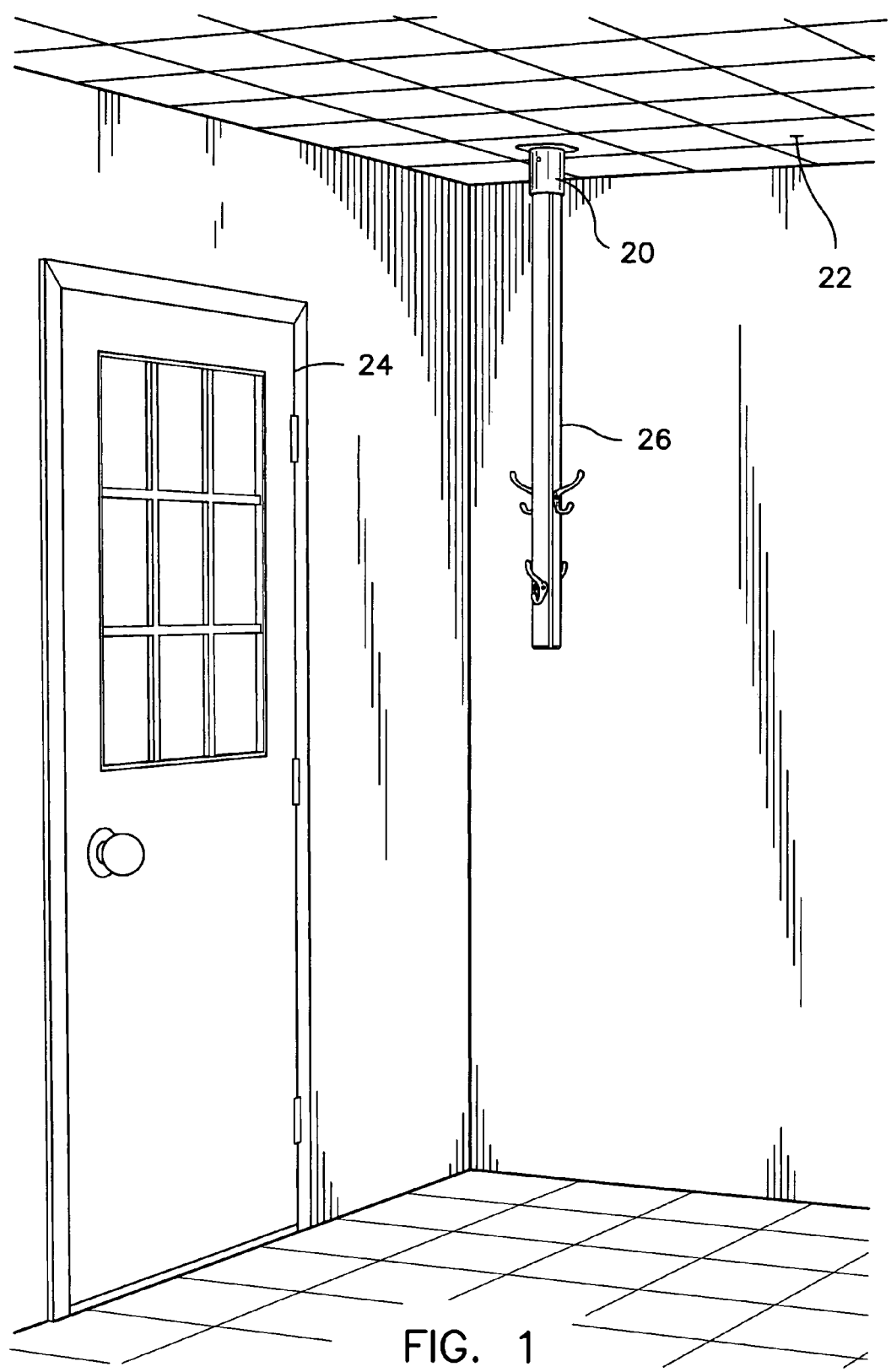
FIG. 1 is a perspective view of the preferred rotating stem mount with a clothes rack attached to it.

While this invention is susceptible of embodiment in many different forms, there is shown in the drawings and will be described in details herein one specific embodiment, with the understanding that the present disclosure is to be considered as an example of the principles of the invention and is not intended to limit the invention to the embodiment illustrated and described.

The rotating stem mount 20 according to the preferred embodiment of the present invention is illustrated in FIG. 1. In this illustration, the rotating stem mount 20 is affixed to a ceiling 22, behind a door 24. A clothes rack 26 is suspended to the rotating stem mount 20, to illustrate a preferred application of the present invention.

Figure 2:
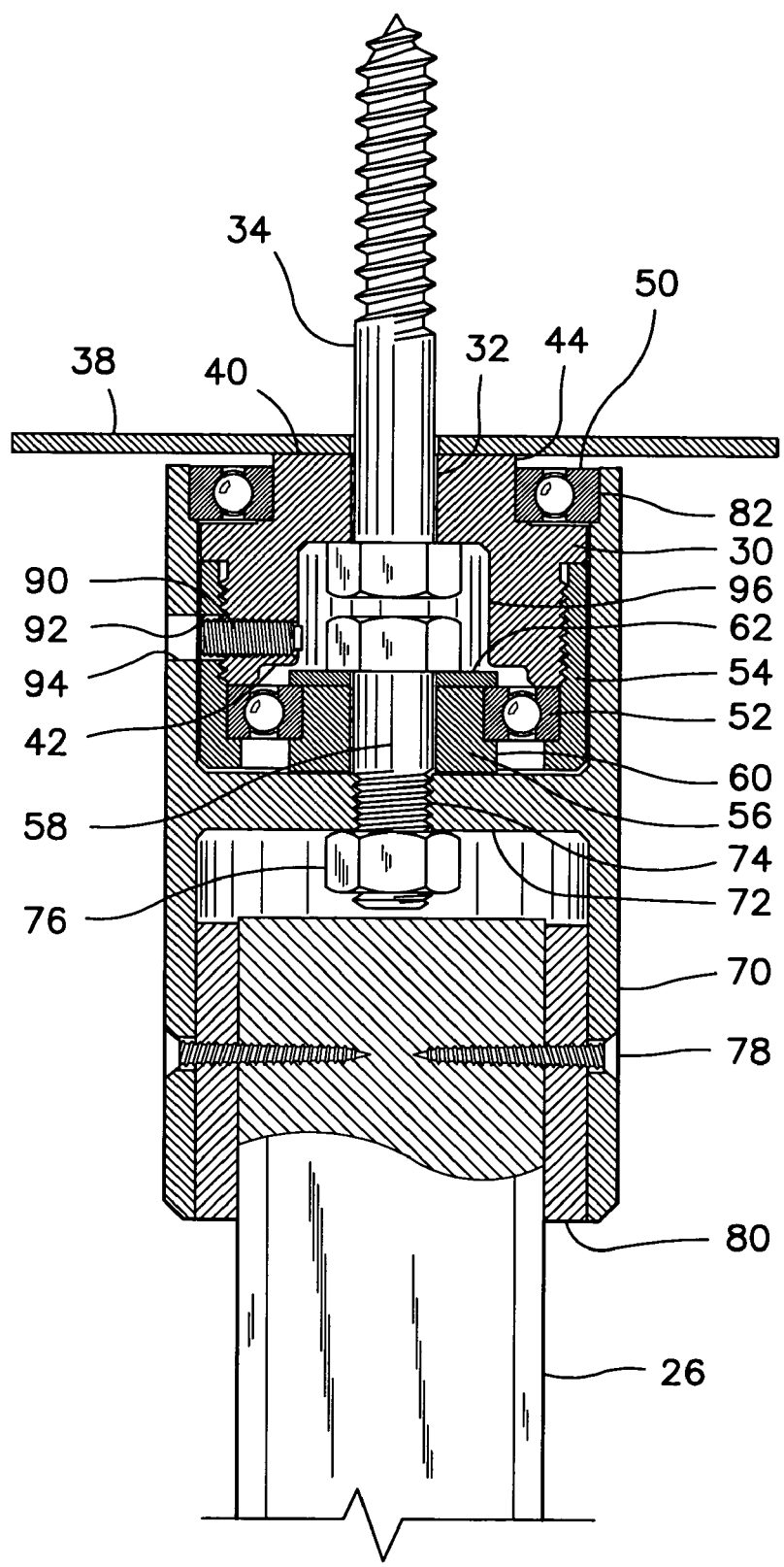
FIG. 2 is a longitudinal cross-section view of the preferred rotating stem mount, with a square stem attached to it.
Figure 3:
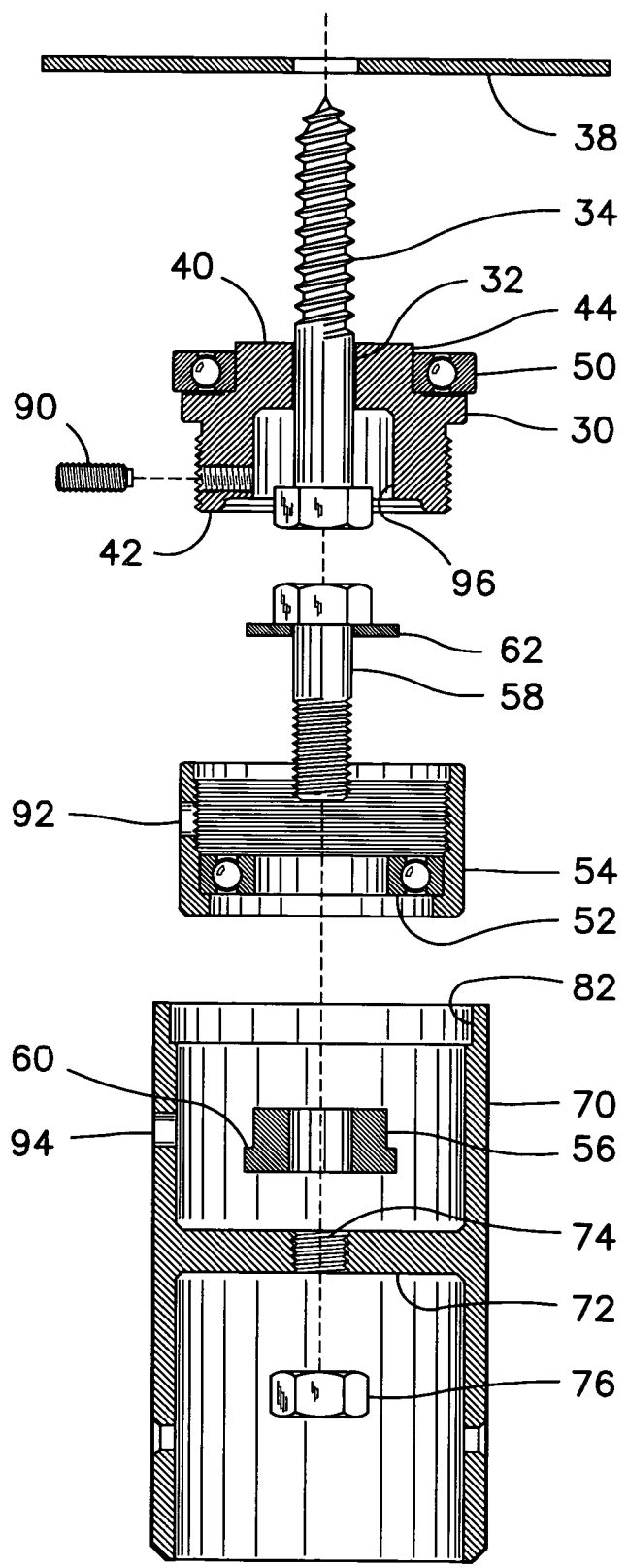
FIG. 3 is a cross-sectional exploded view of the preferred rotating stem mount.

Referring to FIGS. 2 and 3, the preferred rotating stem mount 20 comprises a cylindrical anchor block 30 which has a hole 32 through its central axis. A lag screw 34 is mounted in that hole for retaining the anchor block 30 to a ceiling. The rotating stem mount 20 should be installed in such a way that the lag screw 34 extends into a ceiling joist or other similar strong structural member.

A decorative metal plate 38 is preferably provided with the rotating stem mount 20 for installation between the anchor block 30 and the ceiling surface such that the lag screw 34 can be tightened to a substantial extent without causing the anchor block 30 to sink into the ceiling surface.

For reference purposes, the anchor block 30 has a base end 40 adjacent the decorative plate 38 and a load end 42 in an axially opposite direction of the base end.

The anchor block 30 has a circular shoulder 44 thereon adjacent its base end 40. A first bearing 50 is mounted on that shoulder. This first bearing 50 is referred to herein as the guide bearing 50. The function of this guide bearing 50 will be explained later.

A second bearing 52 is mounted below the anchor block 30 and is held to the anchor block 30 in an axial alignment with the anchor block by means of a cylindrical bearing retainer 54. The bearing retainer 54 encloses the second bearing 52 and has a portion that is threaded onto the cylindrical outside surface of the anchor block 30. This second bearing 52 is referred to herein as the thrust bearing 52. Both bearings 50, 52 are preferably of the type referred to as deep groove ball bearings. The size of the thrust bearing 52 should be selected to carry the desired thrust load applicable to the intended application of the rotating stem mount 20.

A bushing 56 is mounted inside the inner race of the thrust bearing 52. A bolt 58 is mounted through the bushing 56 The bushing 56 has a ridge 60 thereon. This ridge 60 has an outside diameter that is larger than the inside diameter of the thrust bearing 52, and is mounted on the load side of the thrust bearing 52. A washer 62 is provided beneath the head of the bolt 58. The washer 62 also has an outside diameter that is larger than the inside diameter of the thrust bearing 52 and is mounted on the supporting side of the thrust bearing 52. The bolt 58 is mounted through the thrust bearing 52 with its head on the washer 62, and its threaded portion extending away from the load side of the thrust bearing 52. The washer 62 and the ridge 60 on the bushing 56 enclose the thrust bearing 52 axially.

A housing 70 encloses both bearings 50, 52, the anchor block 30 and the bearing retainer 54. The preferred housing has a cylindrical shape and a diametrical partition 72 therein in a mid-region thereof. The partition 72 has a threaded hole 74 along its central axis, and that hole 74 is threaded to the bolt 58. A locknut 76 may also be provided to secure the housing 70 to the bolt 58.

The housing 70 is preferably made with a decorative material, shape and surface finish to match the material, shape and surface finish of the metal plate 38.

The stem 26 to be supported to the rotating stem mount 20 is fastened to the housing 70 in any usual way, and for example, with transverse wood screws 78. In the case of a square stem such as in a conventional clothes rack 26, shims 80 are provided inside the housing 70 to retain the square stem of the clothes rack 26 fitly into the cylindrical housing 70.

The cylindrical housing 70 has a circular step 82 inside its guided or base end and this circular step has dimensions to fitly enclose the outer race of the guide bearing 50.

During the assembling of the rotating stem mount 20 according to the preferred embodiment, the bolt 58 must be held fixed relative to the anchor block 30. For that purpose, a set screw 90 extends radially through the wall of the anchor block 30 and aligns with the head of the bolt 58. A hole 92 through the bearing retainer 54 provides access to the set screw 90.

Prior to assembling the housing 70 over the anchor block 30, the set screw 90 is advanced to bear against the side of the head of the bolt 58 to prevent this bolt from turning. The housing 70, and the locknut 76 if required, can then be mounted to the bolt 58 with ease. A hole 94 through the side of the housing 70 is made to align with the set screw 90 when the housing 70 is mounted to its installed position. Upon assembly of the housing 70 to its final position, the set screw 90 is retracted to allow the bolt 58, the inner race of the thrust bearing 52 and the housing 70 to rotate freely relative to the anchor block 30.

As it can be understood, the bearing retainer 54 has a cylindrical cavity 96 therein, and this cavity has a depth with a sufficient dimension to enclose the head of the lag screw 34 and the head of the bolt 58 plus a clearance there between. The inside diameter of this cavity 96 is sufficient to allow the installation of the lag screw with a socket wrench. The set screw 90 is threaded through the wall of the anchor block 30, between the cylindrical cavity 96 and the outside surface of the anchor block.

In use, the weight on a stem suspended to the rotating stem mount 20 is supported entirely by the thrust bearing 52. Any lateral force on the stem 26 is transmitted to the guide bearing 50 to prevent any surface-to-surface contact between the housing 70 and the anchor block 30. The rotating stem mount 20 is thereby advantageous for carrying combined axial and radial loads.

Although the preferred rotating stem mount 20 has been illustrated and described as a vertical arrangement, it will be appreciated that it can also be mounted sideways to a wall surface, for supporting a horizontal spool of material for example. The rotating stem mount 20 can also be affixed to a floor surface to support revolving trays for example. Because the thrust bearing 52 is axially fixed relative to the anchor block 30, the preferred rotating stem mount can be mounted in any orientation.

Therefore, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A stem mount for rotatably supporting a stem-like member to a stationary surface, comprising;
    an anchor block having a hollow cylindrical shape, an outside surface, a base end and a load end along a central axis thereof, said base end having a hole therein along said central axis and said outside surface having a circular shoulder thereon adjacent said base end;
    a lag screw mounted in said hole for attachment of said anchor block to a stationary surface;
    a guide bearing mounted on said circular shoulder;
    a thrust bearing mounted against said load end of said anchor block in axial alignment with said anchor block; said thrust bearing having an inner race and an outer race;
    a bearing retainer affixed to said anchor block and having means retaining said outer race of said thrust bearing in a fixed relationship with said load end of said anchor block; and
    a housing enclosing said thrust bearing, said guide bearing and said anchor block, said housing having a guided end, a diametrical partition therein in a mid-region thereof and means retaining said diametrical partition to said inner race of said thrust bearing, said housing also having a circular step in said guided end, and said circular step fitly enclosing said guide bearing, said housing further comprising means to retain a stem-like member thereto.

2. The stem mount as claimed in claim 1, further comprising a base plate mounted adjacent said base end of said anchor block.

3. The stem mount as claimed in claim 1 wherein said guide bearing and said thrust bearing are deep groove ball bearings.

4. The stem mount as claimed in claim 1, wherein said means retaining said diametrical partition to said thrust bearing includes a bolt passing through said inner race of said thrust bearing and said diametrical partition.

5. The stem mount as claimed in claim 1, wherein said bearing retainer is a cylindrical cap threaded over said anchor block.

6. The stem mount as claimed in claim 4, wherein said diametrical partition has a threaded hole therein and said threaded hole is engaged over a threaded portion of said bolt.

7. The stem mount as claimed in claim 2, wherein said base plate has a decorative shape and said housing has a cylindrical shape and a surface appearance matching said base plate.

8. The stem mount as claimed in claim 4, further including means to selectively retain said bolt fixed relative to said anchor block.

9. The stem mount as claimed in claim 8, wherein said anchor block has a cylindrical cavity therein and a wall around said cavity, and said cavity enclosing a head of said lag screw and a head of said bolt.

10. The stem mount as claimed in claim 9, wherein said cavity has a diameter for accommodating a socket wrench.

11. The stem mount as claimed in claim 9, wherein said means to selectively retain said bolt, includes a set screw extending radially through said wall of said anchor block.

12. The stem mount as claimed in claim 11, wherein said housing has a radial opening therein aligning with said set screw.

13. A stem mount for rotatably supporting a stem-like member to a stationaiy surface, comprising;
    an anchor block having a hollow cylindrical shape, an outside surface, a base end and a load end along a central axis thereof, said base end having a hole therein along said central axis and said outside surface having a circular shoulder thereon adjacent said base end;
    a lag screw mounted in said hole for attachment of said anchor block to a stationary surface;
    a guide bearing mounted on said circular shoulder;
    a thrust bearing mounted against said load end of said anchor block in axial alignment with said anchor block, said thrust bearing having an inner race and an outer race, a supporting side and a load side relative to orientations of said base end and said load end of said anchor block respectively;
    a bearing retainer affixed to said anchor block and having means retaining said outer race of said thrust bearing in a fixed relationship with said load end of said anchor block;
    a bushing mounted inside said thrust bearing, said bushing having a ridge pressing against said load side of said thrust bearing,
    a washer pressing against said supporting side of said thrust bearing;
    a bolt passing through said washer and said bushing, said bolt having a bolt head pressing against said washer;
    a cylindrical housing enclosing said thrust bearing, said guide bearing and said anchor block, said housing having a diametrical partition therein and a threaded hole in said partition, said threaded hole being engaged with a threaded portion of said bolt for retaining said diametrical partition to said inner race of said thrust bearing;
    said cylindrical housing also comprising a circular step therein and said circular step fitly enclosing said guide bearing; and
    said cylindrical housing further comprising means for retaining a stem-like member thereto.

14. The stem mount as claimed in claim 13, further comprising a base plate mounted adjacent said base end of said anchor block.

15. The stem mount as claimed in clam 13, further comprising a locknut on said bolt for retaining said cylindrical housing to said bolt.

16. The stem mount as claimed in claim 13 wherein said anchor block has a cylindrical cavity therein and a wall around said cavity, and said cavity encloses a bead of said lag screw and said bolt head, and further comprises a set screw extending through said wall and means for moving said set screw for pressing against said bolt head.

17. The stem mount as claimed in claim 16 wherein said cylindrical housing has a hole therein aligning with said set screw.

18. In combination a building surface and a stem mount affixed to said building surface, said stem mount comprising, an anchor block having a hollow cylindrical shape, an outside surface, a base end and a load end along a central axis thereof, said base end having a hole therein along said central axis and said outside surface having a circular shoulder thereon adjacent said base end;

a lag screw mounted in said hole and extending into said building surface for retaining said anchor block to said building surface;

a guide bearing mounted on said circular shoulder;

a thrust bearing mounted against said load end of said anchor block in axial alignment with said anchor block, said thrust bearing having an inner race and an outer race;

a bearing retainer affixed to said anchor block and having means retaining said outer race of said thrust bearing in a fixed relationship with said load end of said anchor block;

a housing enclosing said thrust bearing, said guide bearing and said anchor block, said housing having a diametrical partition therein and means retaining said diametrical partition to said inner race of said thrust bearing, and a circular step therein fitly enclosing said guide bearing; and a stem-like member affixed to said cylindrical housing and extending away from said building surface.

19. The combination as claimed in claim 18 further comprising a base plate mounted between said anchor block and said building surface.

20. The combination as claimed in claim 19, wherein said building surface is a ceiling and said stem-like member is a clothes rack.

* * * * *